US012802468B2

(12) United States Patent
Iida et al.

(10) Patent No.: US 12,802,468 B2
(45) Date of Patent: Nov. 17, 2026

(54) OPERATION ASSIST APPARATUS AND NON-TRANSITORY TANGIBLE STORAGE MEDIUM

(71) Applicant: AIOI SYSTEMS CO., LTD., Tokyo (JP)

(72) Inventors: Tetsuya Iida, Tokyo (JP); Junya Ikeda, Tokyo (JP)

(73) Assignee: AIOI SYSTEMS CO., LTD., Tokyo (JP)

( * ) Notice: Subject to any disclaimer, the term of this patent is extended or adjusted under 35 U.S.C. 154(b) by 321 days.

(21) Appl. No.: 18/698,179

(22) PCT Filed: Jul. 6, 2022

(86) PCT No.: PCT/JP2022/026832
§ 371 (c)(1),
(2) Date: Apr. 3, 2024

(87) PCT Pub. No.: WO2023/067857
PCT Pub. Date: Apr. 27, 2023

(65) Prior Publication Data
US 2024/0412538 A1 Dec. 12, 2024

(30) Foreign Application Priority Data
Oct. 20, 2021 (JP) ................................ 2021-171499

(51) Int. Cl.
*G06T 7/521* (2017.01)
*G06T 7/70* (2017.01)
(Continued)

(52) U.S. Cl.
CPC .............. *G06V 20/64* (2022.01); *G06T 7/521* (2017.01); *G06T 7/70* (2017.01); *G06V 40/107* (2022.01);
(Continued)

(58) Field of Classification Search
None
See application file for complete search history.

(56) References Cited

U.S. PATENT DOCUMENTS 10,471,597 B1 * 11/2019 Murphy ................. B25J 9/1674
10,929,811 B2 * 2/2021 Cole ...................... G06Q 10/00
(Continued)

FOREIGN PATENT DOCUMENTS

CN 103085076 5/2013
CN 110785363 2/2020
(Continued)

OTHER PUBLICATIONS

Translation of the International Preliminary Report on Patentability issued May 2, 2024 in International Application No. PCT/JP2022/026832.

(Continued)

*Primary Examiner* — Tsung Yin Tsai
(74) *Attorney, Agent, or Firm* — Wenderoth, Lind & Ponack, L.L.P.

(57) ABSTRACT

An operation assist apparatus is provided with storage boxes, a three-dimensional sensor, and a processor. The storage boxes store an article. The three-dimensional sensor detects a position of at least a part of a surface of an object that exists in detection regions respectively provided to the storage boxes and generates a distance image that represents a distance to at least a part of the detected surface. The processor judges whether the object takes out the article stored in the storage boxes or whether the object stores the article in the storage boxes, based on the position of at least a part of the surface. In addition, the processor judges, when a number of pixels that represent at least a part of the surface
(Continued)

in the distance image is greater than a threshold value, that the object takes out the article or stores the article in the storage boxes.

12 Claims, 14 Drawing Sheets

(51) Int. Cl.
*G06V 20/64* (2022.01)
*G06V 40/10* (2022.01)

(52) U.S. Cl.
CPC ............... *G06T 2207/10028* (2013.01); *G06T 2207/30196* (2013.01)

(56) References Cited

U.S. PATENT DOCUMENTS

| | | | | |
|---|---|---|---|---|
| 11,173,391 | B1 * | 11/2021 | Kumar | G02B 27/017 |
| 2008/0000983 | A1 * | 1/2008 | Knowles | G06Q 20/209 235/462.01 |
| 2013/0114861 | A1 | 5/2013 | Takizawa | |
| 2015/0019391 | A1 | 1/2015 | Kumar et al. | |
| 2018/0315007 | A1 * | 11/2018 | Kingsford | G06Q 10/087 |
| 2018/0342031 | A1 | 11/2018 | Tada et al. | |
| 2019/0251499 | A1 | 8/2019 | Kumar et al. | |
| 2020/0019921 | A1 * | 1/2020 | Buibas | G06Q 10/087 |
| 2020/0134322 | A1 | 4/2020 | Takahashi et al. | |
| 2020/0222948 | A1 | 7/2020 | Idera et al. | |
| 2020/0407166 | A1 | 12/2020 | Jungbluth et al. | |
| 2022/0187847 | A1 * | 6/2022 | Cella | G05B 19/41885 |
| 2023/0214768 | A1 | 7/2023 | Kumar et al. | |

FOREIGN PATENT DOCUMENTS

| | | |
|---|---|---|
| CN | 110889317 | 3/2020 |
| CN | 111113374 | 5/2020 |
| CN | 111417976 | 7/2020 |
| CN | 111836767 | 10/2020 |
| EP | 3 533 729 | 9/2019 |
| EP | 3 621 000 | 3/2020 |
| JP | 5441393 | 3/2014 |
| JP | 2016-532932 | 10/2016 |
| JP | 2017-048052 | 3/2017 |
| JP | 2017-215067 | 12/2017 |
| JP | 6496082 | 4/2019 |
| JP | 2019-156647 | 9/2019 |
| JP | 2020-017253 | 1/2020 |
| JP | 2020-40767 | 3/2020 |
| JP | 6656328 | 3/2020 |
| JP | 6678790 | 4/2020 |
| JP | 2020-132375 | 8/2020 |
| WO | 2019/106987 | 6/2019 |

OTHER PUBLICATIONS

Extended European Search Report issued Sep. 9, 2025 in counterpart European Patent Application No. 22883169.9.
International Search Report issued Sep. 20, 2022 in International Application No. PCT/JP2022/026832.
First Office Action issued Apr. 10, 2026 in corresponding Chinese Patent Application No. 202280068998.1, with Machine translation.

* cited by examiner

OPERATION ASSIST APPARATUS AND NON-TRANSITORY TANGIBLE STORAGE MEDIUM

TECHNICAL FIELD

The present invention relates to an operation assist apparatus and a non-transitory tangible storage medium.

BACKGROUND

An operation assist apparatus is an apparatus that instructs an operator about which of various articles (for example: parts and products) arranged on shelves should be taken and is widely used in production lines and logistics bases. As an example, an operation assist apparatus is used to instruct an operator about a part among various parts and a number thereof accumulated in a parts warehouse (typically, parts shelves) to assemble into a target product in a production line. As another example, an operation assist apparatus is used to instruct an operator about a product among various products and a number thereof stocked in a product warehouse (typically, products shelves) to store in a target shipper (container) in a logistics base.

For example, Patent Literature 1 discloses a technique of determining whether or not a hand of an operator is inserted into an opening where an article is stored based on detection light. A detection region where the hand is detected based on the detection light is a planar-shaped region. When the article is stored in a storage box arranged on a shelf provided with an opening, the detection region is set at a position away from the storage box. For this reason, when the operator takes out the article from a storage box next to the target storage box, it may be not detected that a non-target article is taken. In addition, when a part of the article enters into the detection region, the hand of the operator may not be detected.

Patent Literatures 2 to 4 disclose techniques of determining whether or not a hand of an operator enters an opening where an article is stored, by use of a camera. An image taken by the camera changes based on surrounding illumination environment. For this reason, false detection may occur due to surrounding illumination environment.

Patent Literature 5 discloses a technique of determining whether a user arranged an article at a stock location or whether the user took the article from the stock location based on an image of a hand of the user before the user enters the stock location and an image of the hand when the user left the stock location. In this case, processing load would increase because the hand has to be tracked.

Patent Literature 6 discloses a technique of determining whether or not a hand of an operator entered an opening where an article is stored, based on a distance image sensor provided to a head-mounted display. In this case, each operator has to wear the head-mounted display.

CITED REFERENCES

Patent Literatures

[Patent Literature 1] Japanese Patent Publication No. 5441393

[Patent Literature 2] Japanese Patent Publication No. 6496082

[Patent Literature 3] Japanese Patent Publication No. 6656328

[Patent Literature 4] Japanese Patent Publication No. 6678790

[Patent Literature 5] Japanese Patent Application Publication 2016-532932

[Patent Literature 6] Japanese Patent Application Publication 2019-156647

SUMMARY

In connection with the above situation, an objective of this disclosure is to provide an operation assist apparatus for effectively performing operations with small processing load. Other objectives will be understood from following disclosures and descriptions of the embodiments.

An operation assist apparatus according to an embodiment in order to achieve the above objective is provided with a plurality of storage boxes, a three-dimensional sensor, and a processor. The plurality of storage boxes stores an article. The three-dimensional sensor detects a position of at least a part of a first surface of a first object that exists in a plurality of first detection regions respectively provided to the plurality of storage boxes, and generates a distance image that represents a distance to at least a part of the detected first surface. The processor judges, based on the position of at least a part of the first surface, whether or not the first object takes out the article stored in the plurality of storage boxes or whether or not the first object stores the article into the plurality of storage boxes. In addition, the processor judges, when a number of pixels that represent at least a part of the first surface in the distance image is greater than a first threshold value, that the first object takes out the article or stores the article into the plurality of storage boxes.

A control program stored in anon-transitory tangible storage medium according to an embodiment in order to achieve the above objective makes a processor execute calculating, in a distance image that represents a distance from a three-dimensional sensor, a number of pixels that represent at least a part of a first surface of a first object that exists in a plurality of first detection regions respectively provided to a plurality of storage boxes that stores an article. In addition, the control program makes the processor execute determining, when the calculated number of the pixels is greater than a first threshold value, that the first object takes out the article or stores the article into the plurality of storage boxes.

According to the above embodiment, operation efficiency can be improved.

Figure 1:
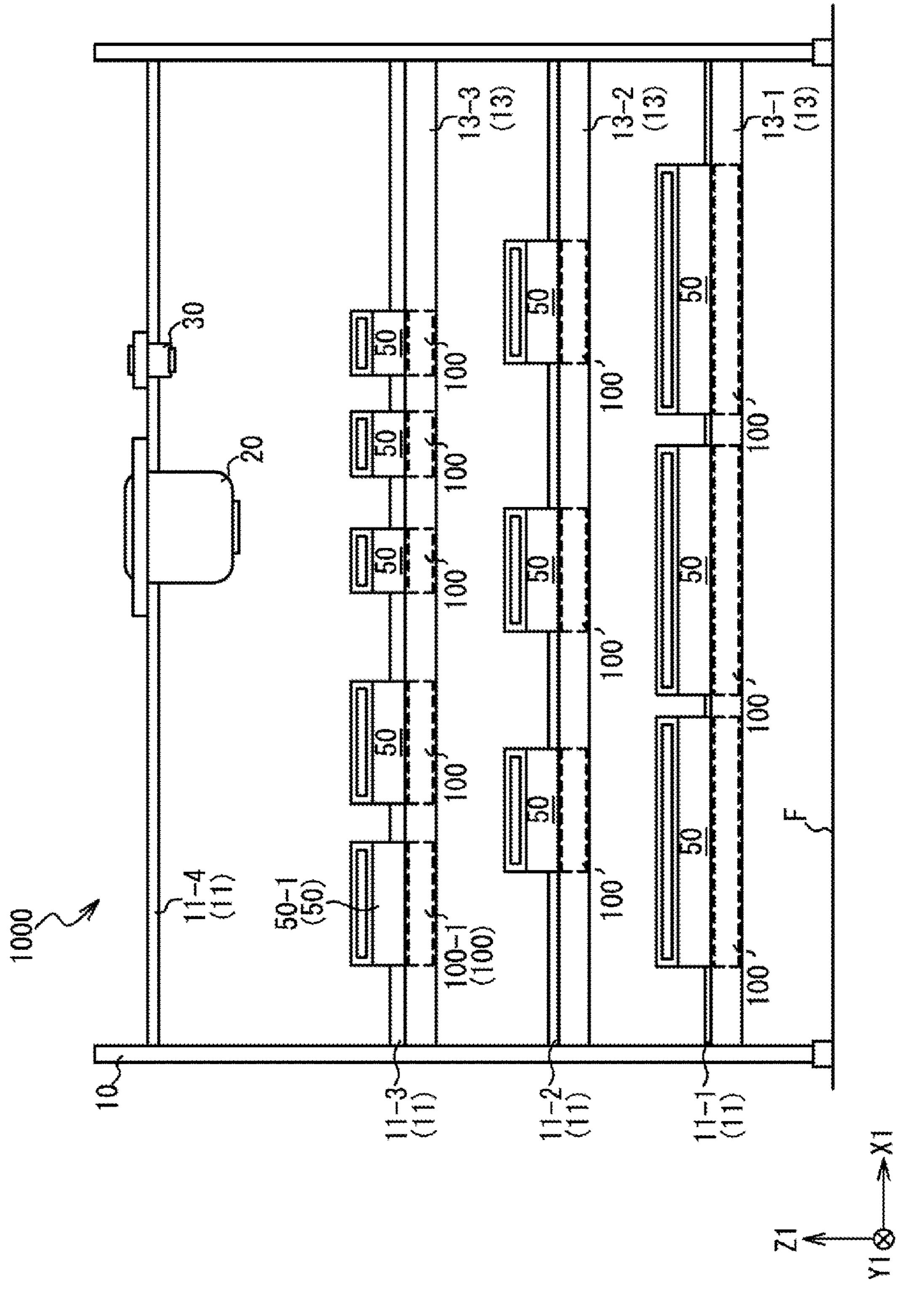
FIG. 1 is a front view of an operation assist apparatus according to an embodiment.

DETAILED DESCRIPTION (Embodiment 1) As shown in FIG. 1, an operation assist apparatus 1000 according to an embodiment is provided with an article shelf 10 arranged on a floor F, a projector 20, a three-dimensional sensor 30, and storage boxes 50. To facilitate understanding, a cartesian coordinate system will be used in following description. A direction X1 is parallel to the floor F and is directed to right when looking at the article shelf 10 from the front. A direction Y1 is parallel to the floor F and is directed to the back of the article shelf 10. A direction Z1 is perpendicular to the floor F and is directed upward.

Figure 2:
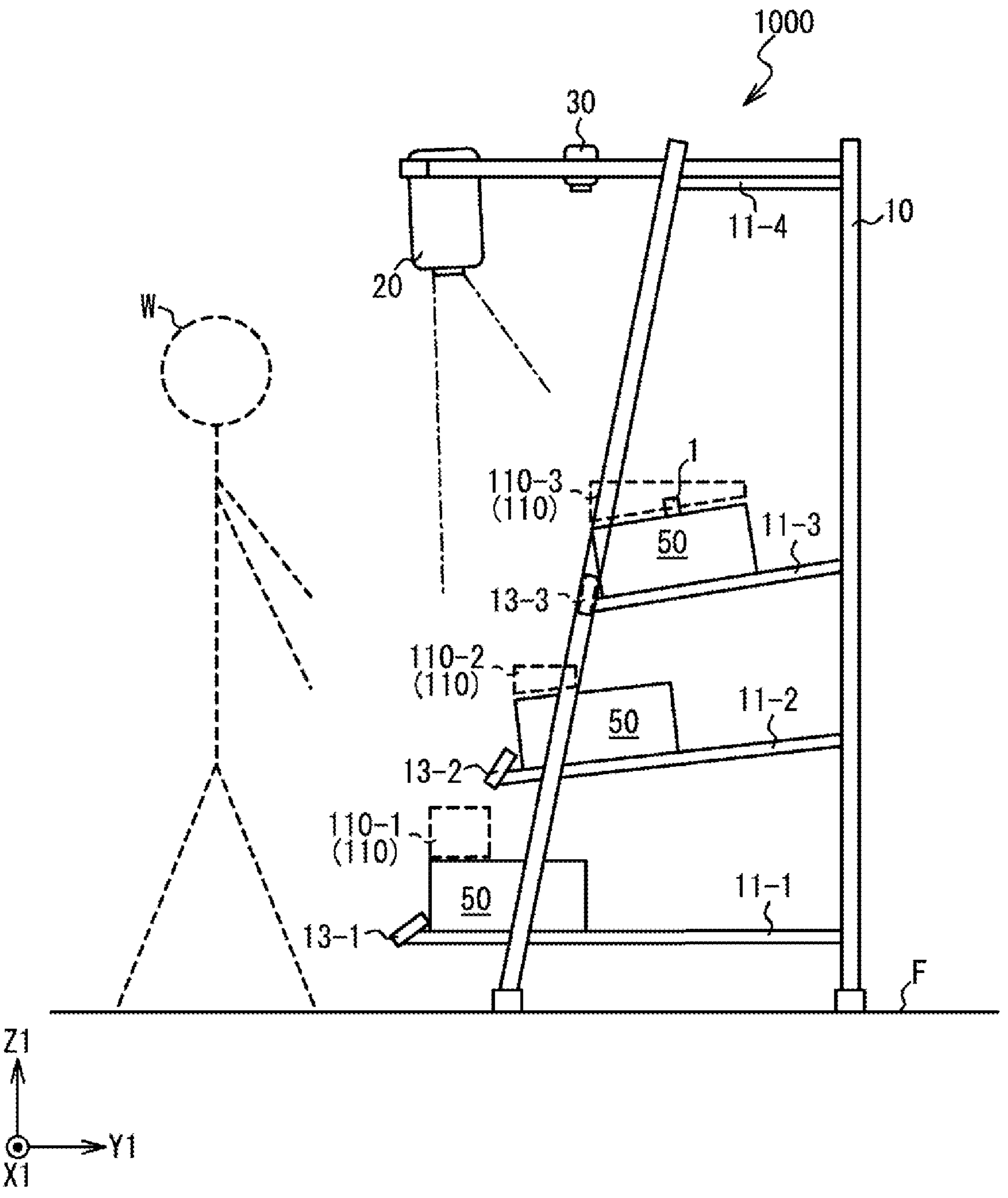
FIG. 2 is a side view of an operation assist apparatus according to an embodiment.

The article shelf 10 is provided with a plurality of baseplates 11 arranged in the direction Z1 (vertical direction). The storage boxes 50 are arranged on the plurality of baseplates 11 that are arranged relatively in a direction −Z1 (downward direction) (for example, a first baseplate 11-1, a second baseplate 11-2, and a third baseplate 11-3). Angles of the baseplates 11 with respect to the floor F may be different to each other, as shown in FIG. 2 for example. For example, the further the baseplate 11 is in the direction −Z1, the smaller the angle between the floor F and the baseplate 11 may be.

In addition, screens 13 may be respectively provided to the baseplates 11 on which the storage boxes 50 are arranged. The screens 13 are, for example, provided at ends of the baseplates 11 in the direction −Y1, so as to protrude from the baseplates 11 in the direction +Z1. As the screens 13 protrude in the direction +Z1, the storage boxes 50 are suppressed from falling. Surfaces of the screens 13 in the direction −Y1 are configured to be projected with images from the projector 20 so that an operator W can visually recognize the projected images.

The projector 20 is provided in the direction +Z1 (upward direction) from the article shelf 10 and displays on the screen 13, when an article (for example, parts or products) is taken out from a storage box 50, an instruction (for example, specification of the article to take out) to the operator W. For example, as shown in FIG. 1, the projector 20 displays a quantity of the article to take out on a display region 100 corresponding to the storage box 50. For example, when an article stored in a first storage box 50-1 is to take out, the projector 20 displays a quantity of the article to take out on a first display area 100-1 of the screen 13 that is in the direction −Z1 from the first storage box 50-1 when viewed from the direction −Y1. The projector 20 is attached to an arm provided to the highest fourth baseplate 11-4, for example.

The three-dimensional sensor 30 is provided in the direction +Z1 (upward direction) from the article shelf 10, and detects a hand of the operator W when taking out an article from a storage box 50. For example, as shown in FIG. 2, the three-dimensional sensor 30 detects an object, the hand of the operator W for example, that exists in detection regions 110 respectively corresponding to the plurality of storage boxes 50. For example, the detection regions 110 are provided at openings of the storage boxes 50. For this reason, the three-dimensional sensor 30 can detect the storage box 50 from which the operator W took out an article, even if the storage boxes 50 are adjacent to each other. The three-dimensional sensor 30 is attached to an arm provided to the highest fourth baseplate 11-4, for example.

In addition, the three-dimensional sensor 30 detects an object that exists in the detection regions 110, the hand of the operator W for example, distinguishably from an article 1 stored in the storage box 50. For this reason, the three-dimensional sensor 30 can detect a hand of an operator W even if an article 1 is in a detection area 110.

For example, the three-dimensional sensor 30 is a distance image sensor that measures a distance to an object in each direction by use of light waves and generates an image that represents the measured distances. The three-dimensional sensor 30 may generate a distance image by times of flight (TOF) method for example. The distance image may represent a distance from the three-dimensional sensor 30 to the object in an optical axis direction of light waves outputted by the three-dimensional sensor 30. For example, when the optical axis direction of the light waves outputted by the three-dimensional sensor 30 is the vertical direction, the distance represented by the distance image represents a height difference between the three-dimensional sensor 30 and the object.

A shape of the detection region 110 may be determined based on a direction in which the object, the hand of the operator W for example, enters therein. For example, the detection region 110 may be formed so that a cross-sectional area of at least a part thereof, perpendicular to a direction in which the object enters, decreases as the object moves in an advancing direction, the direction +Y1 for example. For example, the detection region 110 is formed so that the cross-sectional area perpendicular to the direction in which the object enters decreases as the object moves in the advancing direction, at an edge of the detection region 110 in the direction in which the object moves, the direction +Y1 for example. In addition, the detection region 110 may be formed so that the cross-sectional area thereof perpendicular to the direction in which the object enters therein decreases as the object moves in the advancing direction from an edge to another edge in the direction in which the object enters, the direction +Y1 for example.

For example, a length of the detection region 110 in the direction Z1 may monotonically increase in the direction −Y1, in a broad sense or a narrow sense for example, as shown in the second detection region 110-2 and the third detection region 110-3. As the hand of the operator W enters the detection region 110 from a position in the direction −Y1 from the storage box 50, the three-dimensional sensor 30 detects the hand of the operator W more reliably and the detection region 110 can be made smaller.

In addition, in a direction perpendicular to a plane through which the article 1 is taken out from the storage box 50, for example a top plane, the length of the detection region 110 may monotonically increase in the direction −Y1, in the broad sense or the narrow sense for example, as shown in the second detection region 110-2 and the third detection region 110-3. The three-dimensional sensor 30 can detect the hand of the operator W more reliably.

In addition, the cross-sectional area perpendicular to the direction in which the object enters the detection region 110 may be constant regardless of a position in the direction which the object enters. For example, the length of the detection region 110 in the direction Z1 may be a constant value regardless of the position in the direction Y1, as shown in the first detection region 110-1.

An end face of the detection region 110 in the direction +Z1 may be set so that a distance to each point on the end face represented by the distance image becomes equal. For example, when an optical axis direction of light waves that the three-dimensional sensor 30 outputs is the vertical direction, the end face may represent a horizontal plane.

The detection regions 110 may be configured in different shapes in accordance with the baseplates 11 on which the storage boxes 50 are arranged. As directions in which the hand of the operator W enters the detection regions 110 differ depending on the heights of the baseplates 11, the detection regions 110 may be determined based on the directions in which the hand of the operator W enters. In addition, the detection regions 110 may be configured in an identical shape regardless of the baseplates 11 on which the storage boxes 50 are arranged.

Figure 3:
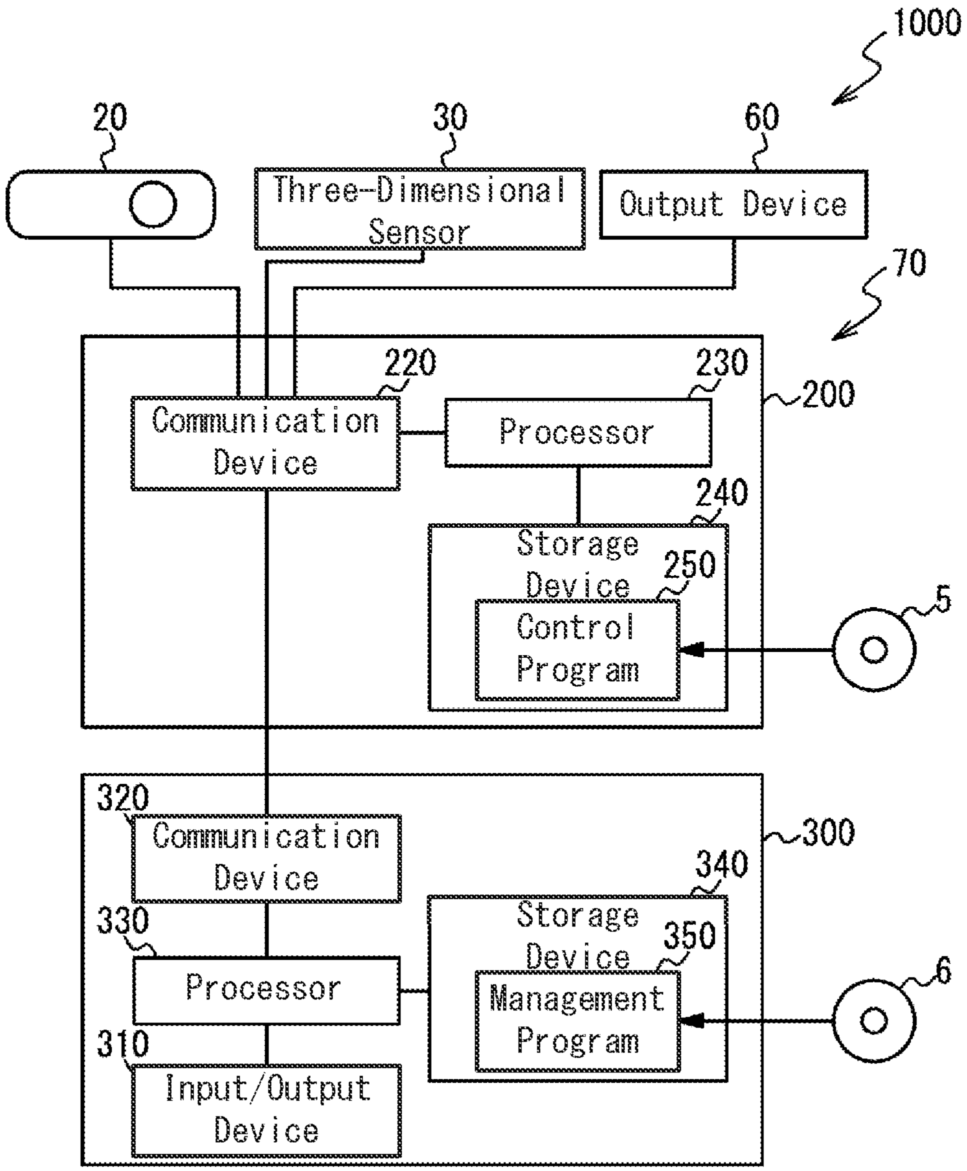
FIG. 3 is a configuration diagram of an operation assist apparatus according to an embodiment.

As shown in FIG. 3, the operation assist apparatus 1000 is further provided with an output device 60 and a control device 70. The output device 60 notifies operation mistakes such as difference of article 1 that the operator W took out from the article 1 that should be taken out. For example, the output device 60 includes a speaker and notifies the operator W with the operation mistakes by voice and/or sound. The output device 60 may be incorporated in the projector 20 or omitted.

The control device 70 controls the projector 20, the three-dimensional sensor 30, and the output device 60. The control device 70 is provided with a control terminal 200 and a management terminal 300, for example. The management terminal 300 determines an article 1 that the operator W should take out and outputs the determined article information to the control terminal 200. The control terminal 200 outputs to the projector 20 instruction information for instructing the operator W with the article 1 to take out, based on the article information received from the management terminal 300. In addition, the control terminal 200 judges whether or not the operator W is taking out the instructed article 1 based on detection information obtained from the three-dimensional sensor 30.

The control terminal 200 is provided with a communication device 220, a processor 230, and a storage device 240. The control terminal 200 is for example a computer. For example, the control terminal 200 may be further provided with input/output devices such as a keyboard, a mouse, a microphone, a display, a speaker, a touch panel, and the like.

The communication device 220 is electrically connected to the projector 20, the three-dimensional sensor 30, the output device 60, and the management terminal 300, and performs communication with each device. For example, the communication device 220 transfers the instruction information obtained from the management terminal 300 to the processor 230. In addition, the communication device 220 transfers signals that the processor 230 generates to each device. The communication device 220 includes various interfaces such as network interface card (NIC), universal serial bus (USB), and the like.

The storage device 240 stores various data for judging whether or not the operator W is taking out the instructed article 1, such as a control program 250. The storage device 240 is used as a non-transitory tangible storage medium that stores the control program 250. The control program 250 may be provided as a computer program product recorded in a computer-readable storage medium 5, or a computer program product downloadable from a server.

The processor 230 executes the control program 250 to perform various data processes to judge whether or not the operator W is taking out the instructed article 1. For example, the processor 230 includes a central processing unit (CPU) or the like. In addition, the processor 230 executes the control program 250 to generate image information that represents an image for the projector 20 to project on the screen 13.

The management terminal 300 is provided with an input/output device 310, a communication device 320, a processor 330, and a storage device 340. The management terminal 300 is for example a computer. The input/output device 310 is inputted with information for the processor 330 to execute processes. In addition, the input/output device 310 outputs a result of the processes that the processor 330 executed. The input/output device 310 includes various input devices and output devices, such as a keyboard, a mouse, a microphone, a display, a speaker, a touch panel.

The communication device 320 is electrically connected to the control terminal 200, and performs communications with the control terminal 200. For example, the communication device 320 transfers a signal that the processor 330 generated to the communication device 220 of the control terminal 200. In addition, the communication device 320 transfers a signal obtained from the communication device 220 of the control terminal 200 to the processor 330. The communication device 320 includes various interfaces such as NIC, USB, or the like.

The storage device 340 stores various data for determining the article 1 that the operator W should take out, such as a management program 350. The storage device 340 is used as a non-transitory tangible storage medium that stores the management program 350. The management program 350 may be provided as a computer program product recorded in a computer-readable storage medium 6 or a computer program product that is downloadable from a server. The storage medium 6 may be identical to the storage medium 5.

The processor 330 executes the management program 350 to perform various data processes for determining the article 1 that the operator W should take out. For example, the processor 330 includes a CPU or the like.

(Operation of operation assist apparatus) When the operation assist apparatus 1000 is started, for example when the control terminal 200 and the management terminal 300 are started, a process for assisting a picking operation starts. When started, the processor 330 of the management terminal 300 shown in FIG. 3 executes the management program 350 to start the process shown in FIG. 4. In the step S110, the processor 330 determines the article 1 that the operator W should take out and the quantity thereof, and outputs the instruction information that represents the article 1 and the quantity that are determined to the communication device 220 of the control terminal 200. The information that represents the article 1 that the operator W should take out and the quantity thereof is stored in the storage device 340. The processor 330 reads out the information representing the article 1 and its quantity that is stored in the storage device 340 and outputs the read information as the instruction information to the communication device 220 of the control terminal 200.

In the step S120, the processor 230 of the control terminal 200 instructs the operator W with the article 1 to take out, based on the instruction information obtained from the management terminal 300. For example, the processor 230 determines the storage box 50 corresponding to the article 1 represented by the instruction information. As shown in FIG. 1, the processor 230 generates an image for displaying the quantity represented by the instruction information on the display region 100 corresponding to the determined storage box 50. The instruction information that represents the generated image is outputted to the projector 20. It should be noted that the information that represents the article 1, the information that represents the storage box 50, and the information that represents the display region 100 are stored in association with each other in the storage device 240.

The projector 20 projects the image that represents the quantity of the article 1 to be taken out on the display region 100 of the screen 13 that corresponds to the storage box 50 in which the article 1 to be taken out is stored, based on the instruction information. An image that represents the article 1 to be taken out may be projected in addition on the display region 100.

Figure 4:
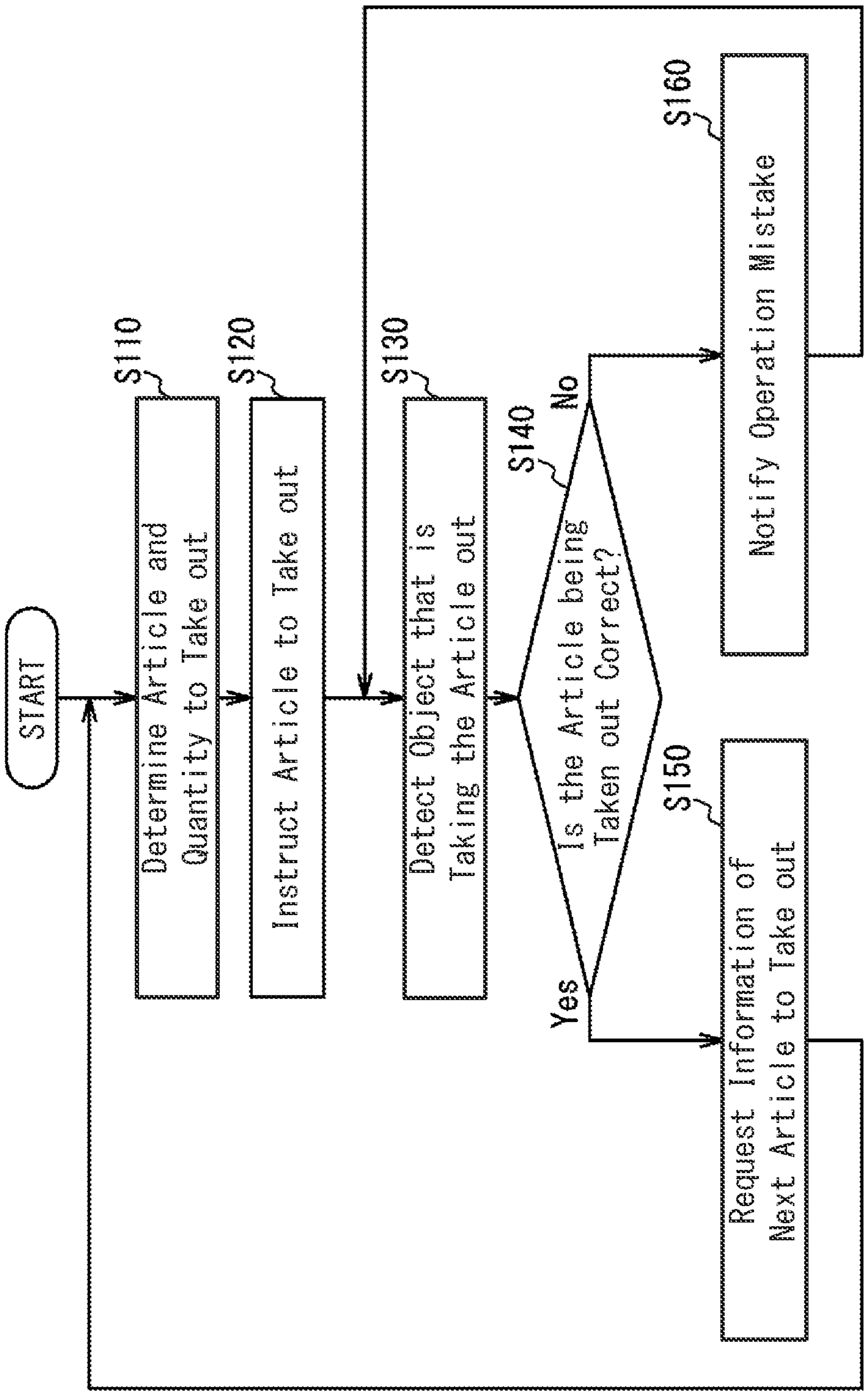
FIG. 4 is a flowchart that shows a process of an operation assist apparatus according to an embodiment.
Figure 5:
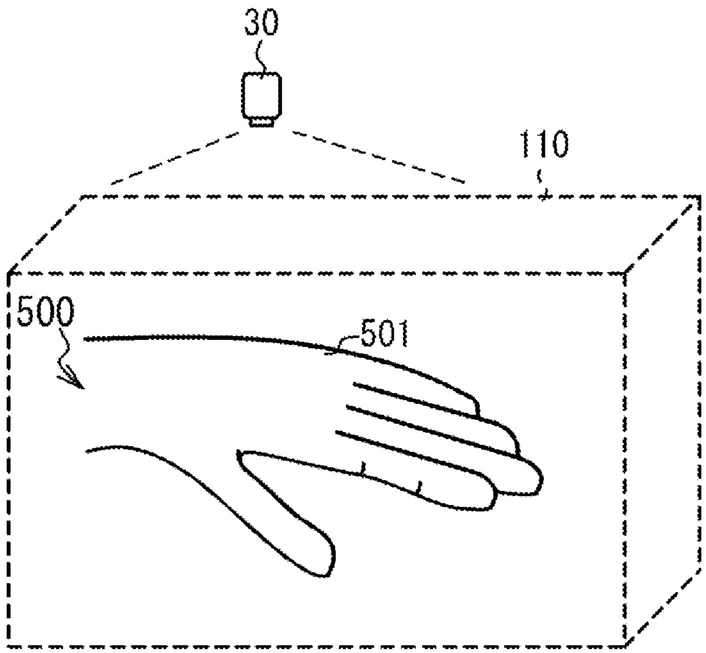
FIG. 5 is a diagram for describing a method by a three-dimensional sensor to detect an object in an embodiment.

In the step S130 shown in FIG. 4, the processor 230 detects the object that takes out the article 1. The operator W takes out the article 1 from the storage box 50 that corresponds to the display region 100 on which the image is projected. When the hand of the operator W enters the detection region 110 shown in FIG. 2, the three-dimensional sensor 30 detects the hand of the operator W. For example, as shown in FIG. 5, the three-dimensional sensor 30 irradiates a plurality of detection regions 110 with light waves such as infrared rays. For example, the three-dimensional sensor 30 irradiates the plurality of detection regions 110 with light waves when the control terminal 200 is started. The light waves irradiated by the three-dimensional sensor 30 are reflected by an object 500 in the detection region 110, the hand of the operator W for example. The three-dimensional sensor 30 receives the reflected light waves as a reflected wave and detects the object 500 that exists in the detection region 110.

In particular, the three-dimensional sensor 30 receives the reflected wave that is reflected by at least a part of a surface 501 of the object 500. The three-dimensional sensor 30 measures a distance to each position of the surface 501 that is irradiated with the light waves, based on a time from irradiation of the light waves to reception of the reflection wave. In addition, the three-dimensional sensor 30 measures a relative direction at each position of the surface 501, based on a direction to receive the reflection wave, an angle between the direction Z1 for example. Each position of the surface 501 of the object 500 is measured based on the relative direction and the distance at each position of the surface 501. The detection information that represents the position of the surface 501 of the object 500 is outputted to the processor 230 of the control terminal 200. The detection information represents the distance image in which the distance from the three-dimensional sensor 30 to the detected object 500 is mapped in accordance with the relative direction. The position of a pixel shown in the distance image represents the relative distance from the three-dimensional sensor 30, and a value added to the pixel represents the distance to the object 500 that exists in the corresponding relative direction. For example, when the distance image is taken by the camera from the three-dimensional sensor 30 in the optical axis direction of the irradiated light waves, the value represented by each pixel included in the taken image represents the distance from the three-dimensional sensor 30 to the object represented by the pixel.

The processor 230 of the control terminal 200 judges whether the object 500 that takes out the article 1 exists in the detection region 110, based on the detection information. The processor 230 judges whether the object 500 takes out the article 1 based on a number of pixels of a region that represents the detected object 500 in the distance image. For example, the processor 230 calculates the number of pixels of at least a part of the surface 501 of the detected object 500. The processor 230 compares the calculated number of pixels of the surface 501 and a first threshold value to judge whether or not the object 500 that takes out the article 1 exists in the detection region 110. When the calculated number of pixels is greater than the first threshold value, the processor 230 judges that the object 500) that takes out the article 1 exists in the detection region 110. Herein, the surface 501 represents a set of consecutive positions among the positions detected by the three-dimensional sensor 30. For example, when in the distance image a difference of distances that adjacent pixels represent is smaller than the first threshold value, the processor 230 judges that the adjacent pixels form a same surface 501.

The first threshold value is predetermined so that the article 1 stored in the storage box 50 shown in FIG. 2 and the object 500 that takes out the article 1, for example the hand of the operator W, can be distinguished. For example, when the processor 230 calculates the number of pixels of the surface 501 of the object 500, the first threshold value is determined such to become greater than a number of pixels of a part included in the detection region 110 of the article 1 stored in the storage box 50 and smaller than a number of pixels of the object 500. The first threshold value may differ depending to the corresponding storage box 50. For example, a first threshold value determined for a detection region 110 may be different from a first threshold value determined for at least one other detection region 110. The first threshold value may be determined in accordance with the article 1 stored in the storage box 50. In addition, the first threshold value may differ depending to the distance from the three-dimensional sensor 30 to the detection region 110, for example for each baseplate 11. For example, the longer the distance from the three-dimensional sensor 30 to the detection region 110 is, the smaller the first threshold value is.

The processor 230 may judge that the object 500 that takes out the article 1 to the detection region 110 exists when the calculated number of pixels of the surface 501 is included within a range from the first threshold value to a second threshold value. Herein, the second threshold value is greater than the first threshold value and represents an upper limit for judging that the object 500 exists. For example, the processor 230 judges that the object 500 that takes out the article 1 to the detection region 110 exists when the calculated number of pixels of the surface 501 is greater than the first threshold value and smaller than the second threshold value.

The second threshold value is predetermined such that the object 500 that takes out the article 1 to the detection region 110 and other objects such as a head of the operator W can be distinguished. For example, the second threshold value is determined to a value with which the number of pixels of the object 500 becomes maximal when the article 1 is taken out in the detection region 110. In addition, the second threshold value may differ, similarly to the first threshold value, depending to the distance from the three-dimensional sensor 30 to the detection region 110. For example, the longer the distance from the three-dimensional sensor 30 to the detection region 110 is, the smaller the second threshold value is.

When no object 500 that takes out the article 1 to the detection region 110 exists, the processor 230 waits until the object 500 that takes out the article 1 to the detection region

110 enters. When the object 500 that takes out the article 1 to the detection region 110 exists, the processor 230 executes the process of the step S140.

In the step S140, the processor 230 judges whether the article 1 that the object 500 takes out is correct. In particular, the processor 230 judges whether the article 1 that the object 500 takes out is identical to the article 1 represented by the instruction information obtained from the management terminal 300. For example, the processor 230 searches for the storage box 50 that corresponds to the detection region 110 where the object 500 exists. The processor 230 searches for the article 1 that corresponds to the searched storage box 50 and judges whether or not the searched article 1 is identical to the article 1 represented by the instruction information. The information that represents the detection region 110, the information that represents the storage box 50, and the information that represents the article 1 are preliminary stored to the storage device 240 in association with each other.

The processor 230 executes the step S150 when the article 1 that the object 500 takes out is identical to the article 1 represented by the instruction information obtained from the management terminal 300. When the article 1 that the object 500 takes out differs from the article 1 represented by the instruction information obtained from the management terminal 300, the processor 230 executes the step S160.

When the article 1 that the object 500 takes out is correct, the processor 230 judges that the operator W took out the correct quantity of the correct article 1 and requests information of the next article 1 to takeout to the management terminal 30) in the step S150. The process returns to the step S110 and is repeated.

When the article 1 that the object 500 took out is incorrect, the processor 230 notifies the operator W of an operation mistake that represents that a incorrect article 1 is taken out in the step S160. For example, the processor 230 controls the projector 20 to display an image that flashes red. In addition, the processor 230 may control the output device 60 to output a warning sound that represents the operation mistake. When the processor 230 does not detect the object 500 any more in detection region 110, the processor 230 executes the process of the step S130 and repeats the process.

As described above, by setting the detection regions 110 corresponding to the openings of the plurality of storage boxes 50, the operation assist apparatus 1000 can judge with higher accuracy the article 1 that the operator W takes out. In addition, even if the article 1 stored in the storage box 50 exists in the detection region 110, the operation assist apparatus 1000 can distinguish to detect the article 1 and the object 500 that takes out the article 1.

(Setting of detection regions) The detection regions 110 may be set based on the distance image obtained by the three-dimensional sensor 30. For example, the image information that represents the distance image obtained by the three-dimensional sensor 30 is transferred from the processor 230 of the control terminal 200 shown in FIG. 3 to the processor 330 of the management terminal 300. The processor 330 of the management terminal 300 displays on the input/output device 310 the distance display image that represents the distance to the detected object 500 based on the obtained image information. The distance display image represents the object included within a range of the distance image that a user specifies. The user verifies the displayed distance display image and inputs information that represents the detection region 110 to the input/output device 310. The processor 330 of the management terminal 300 outputs the inputted information that represents the detection region 110 to the processor 230 of the control terminal 200. The processor 230 sets the detection region 110 based on the inputted information that represents the detection region 110.

In addition, the processor 330 displays, when setting the detection region 110, the distance display image that corresponds to the distance range inputted by the user. For example, when the distance range represents a range from an end face in the direction +Z1 (upward direction) of the storage box 50 arranged on the first baseplate 11-1 shown in FIG. 1 to an end face in the direction +Z1 of the first detection region 110-1, the processor 330 displays a first distance display image 600 shown in FIG. 6A. The first distance display image 600 shows a distance to an object included in the inputted distance range by a difference of pixel colors, for example hue, saturation, and brightness.

For example, when a difference of distances is shown by four colors, the first distance display image 600 shows by a first color 601 a position where an object in a distance equal to or longer than a minimal value of the inputted distance range and shorter than the first threshold value is detected. In addition, the first distance display image 600 shows by a second color 602 a position where an object in a distance equal to or longer than the first threshold value and shorter than the second threshold value is detected. The first distance display image 600 shows by a third color 603 a position where an object in a distance equal to or longer than the second threshold value and shorter than a third threshold value is detected. The first distance display image 600 shows by a fourth color 604 a position where an object in a distance equal to lo longer than the third threshold value and equal to or shorter than a maximal value of the inputted distance range is detected. As described above, by the processor 330 displaying the first distance display image 600 that represents the object detected in the distance range inputted by the user, the user can easily understand the detection region 110 that corresponds to the inputted distance range.

For example, the user specifies a range in the direction X1 and a range in the direction Y1 of the detection region 110 shown in FIG. 2 in accordance with the region of the storage box 50 represented by the first distance display image 600. The direction X1 shown in FIG. 2 represents the direction X2 in the first distance display image 60) shown in FIG. 6A. Similarly, the direction Y1 shown in FIG. 2 represents the direction Y2 in the first distance display image 600 shown in FIG. 6A. For this reason, the range in the direction X1 of the detection region 110 corresponds to the range in the direction X2 in which the storage boxes 50 are represented in the first distance display image 600. In addition, the range in the direction Y1 of the detection region 110 corresponds to the range in the direction Y2 in which the storage boxes 50 are represented in the first distance display image 600.

In addition, the user specifies an end in the direction −Z1 (downward end) of the detection region 110 shown in FIG. 2 in accordance with the distance of the storage box 50 represented in the first distance display image 600. The detection region 110 is set in the direction +Z1 from an end in the direction +Z1 (upward end) of the storage box 50. For this reason, the end in the direction −Z1 of the detection region 110 is set at a position with a shorter distance of the storage box 50 represented in the first distance display image 600. The detection region 110 may include the end in the direction +Z1 (upward end) of the storage box 50. In this case, the threshold values for detecting the object 500 are set to include the number of pixels of the detected storage box 50.

Furthermore, the user specifies an end in the direction +Z1 (upper end) of the detection region 110 shown in FIG. 2 in accordance with the distance of the surface 501 of the object 500 represented in the first distance display image 600. The detection region 110 is set to detect the object 500 that takes out the article 1 stored in the storage box 50. For this reason, the user specifies the end in accordance with the distance of the surface 501 represented in the first distance display image 600 when taking out the article 1 stored in the storage box 50. For example, when the user takes out the article 1, a position with the shortest distance of the distances of the surface 501 reflected in the first distance display image 600 is set to the end in the direction +Z1 (upward end) of the detection region 110.

In addition, the first distance display image 600 may display in real time the number of pixels that represent the surface 501 of the object 50) entered in one of the plurality of detection regions 110, for example the first detection region 110-1. The user verifies the displayed number of pixels and sets the threshold values for judging the existence of the object 500 entered into the detection regions 110 and the detection regions 110. As a result, the user can easily set the threshold values and the detection regions 110.

Next, when the detection regions 110 corresponding to the storage boxes 50 arranged on the first baseplate 11-1 shown in FIG. 2 are set, the user changes the distance range of the distance display image that the processor 330 displays in order to set the detection regions 110 that correspond to the storage boxes 50 arranged on the second baseplate 11-2. For example, the user inputs a range from the end surface in the direction +Z1 (upward direction) of the storage boxes 50 arranged on the second baseplate 11-2 shown in FIG. 1 to the end surface in the direction +Z1 of the second detection region 110-2 as the distance range. The processor 330 displays a second distance display image 650 shown in FIG. 6B in accordance with the inputted distance range. In the second distance display image 650, the storage boxes 50 are represented in the direction +Y2 from the storage boxes 50 represented in the first distance display image 600. The user specifies the second detection region 110-2 based on the second distance display image 650, similarly to the first detection region 110-1. Similarly, the user specifies the third detection region 110-3 that corresponds to the storage box 50 arranged on the third baseplate 11-3 shown in FIG. 2.

As described above, by the processor 330 displaying the first distance display image 600 that represents the range of distance that the user inputted based on the distance image, the user can easily set the detection region 110 and the threshold values for detecting the object 500.

Figure 7:
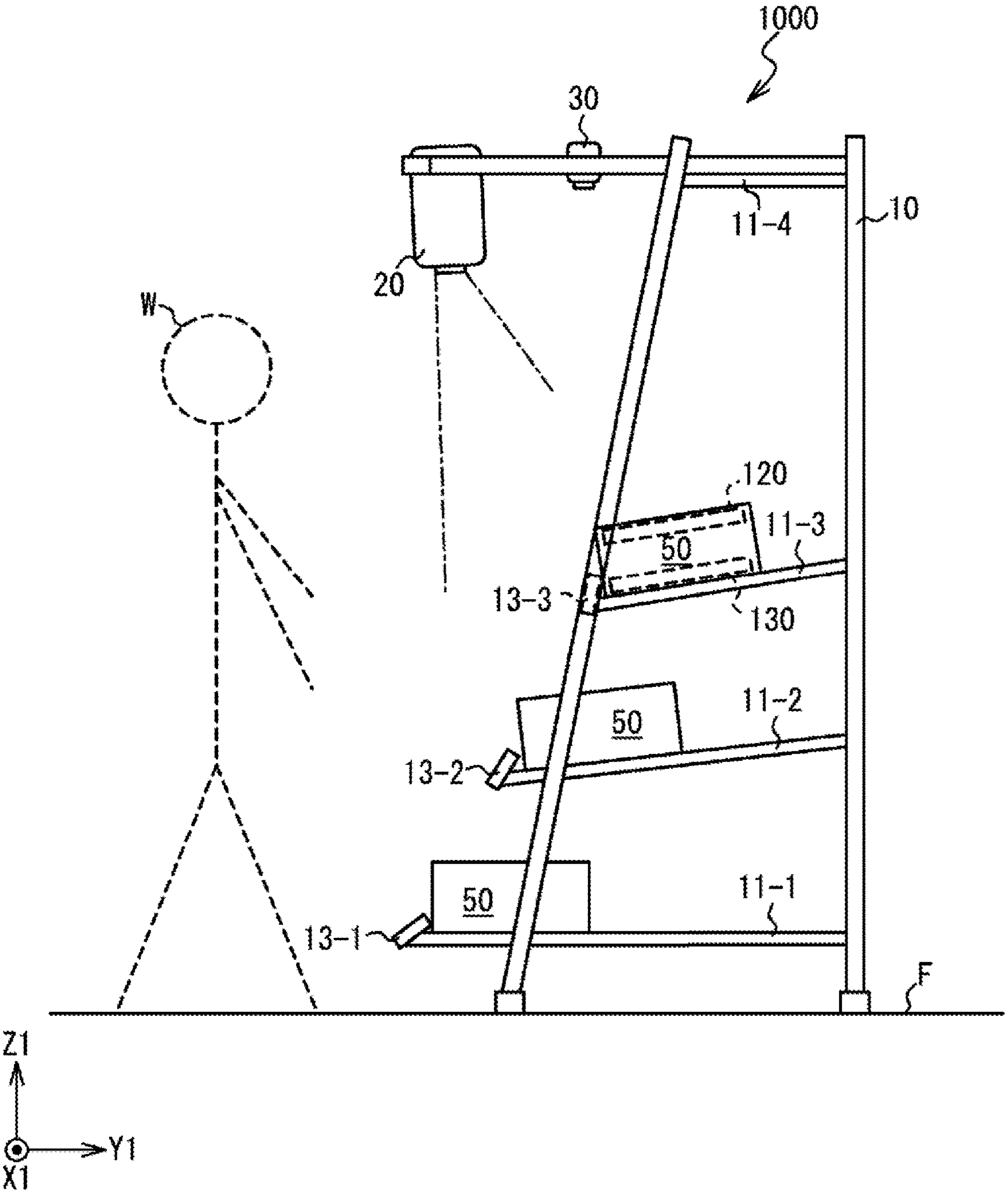
FIG. 7 is a diagram for describing a fullness detection region and an emptiness detection region according to an embodiment.

(Fullness detection) As shown in FIG. 7, the three-dimensional sensor 30 detects the article 1 that exists in a fullness detection region 120 provided in the opening of the storage box 50. The fullness detection region 120 is provided at an end in the direction +Z1 inside the storage box 50. The fullness detection region 120 may be elongated in the direction +Z1 from the end in the direction +Z1 of the storage box 50. For example, the three-dimensional sensor 30 detects a position of at least a part of a surface of the article 1 that exists in the fullness detection region 120 and generates a distance image that represents a distance to the surface of at least a part of the detected article 1. The processor 230 of the control terminal 200 judges, when the number of pixels that represent the surface of at least a part of the article 1 in the distance image is greater than a fullness threshold value, that the corresponding storage box 50 is full of the articles 1. The processor 230 notifies, when judging that the corresponding storage box 50 is full of the articles 1, the operator W that the storage box 50 is full. For example, the processor 230 projects on the screen 13 of the corresponding storage box 50 an image that represents the fullness thereof. The image that represents the fullness may be shown by letters or colors.

(Emptiness detection) The three-dimensional sensor 30 detects an article 1 that exists in an emptiness detection region 130 provided at an end in the direction −Z1 inside the storage box 50, for example at the bottom. For example, the three-dimensional sensor 30 detects a position of at least a part of a surface of the article 1 that exists in the emptiness detection region 130 and generates a distance image that represents a distance to the surface of at least a part of the detected article 1. The processor 230 of the control terminal 200 judges, when the number of pixels that represent the surface of at least a part of the article 1 in the distance image is smaller than an emptiness threshold value, that the corresponding storage box 50 is empty. The processor 230 notifies, when judging that the corresponding storage box 50 is empty, the operator W that the storage box 50 is empty. For example, the processor 230 projects on the screen 13 of the corresponding storage box 50 an image that represents the emptiness thereof. The image that represents the emptiness may by shown by letters or colors.

Figure 8:
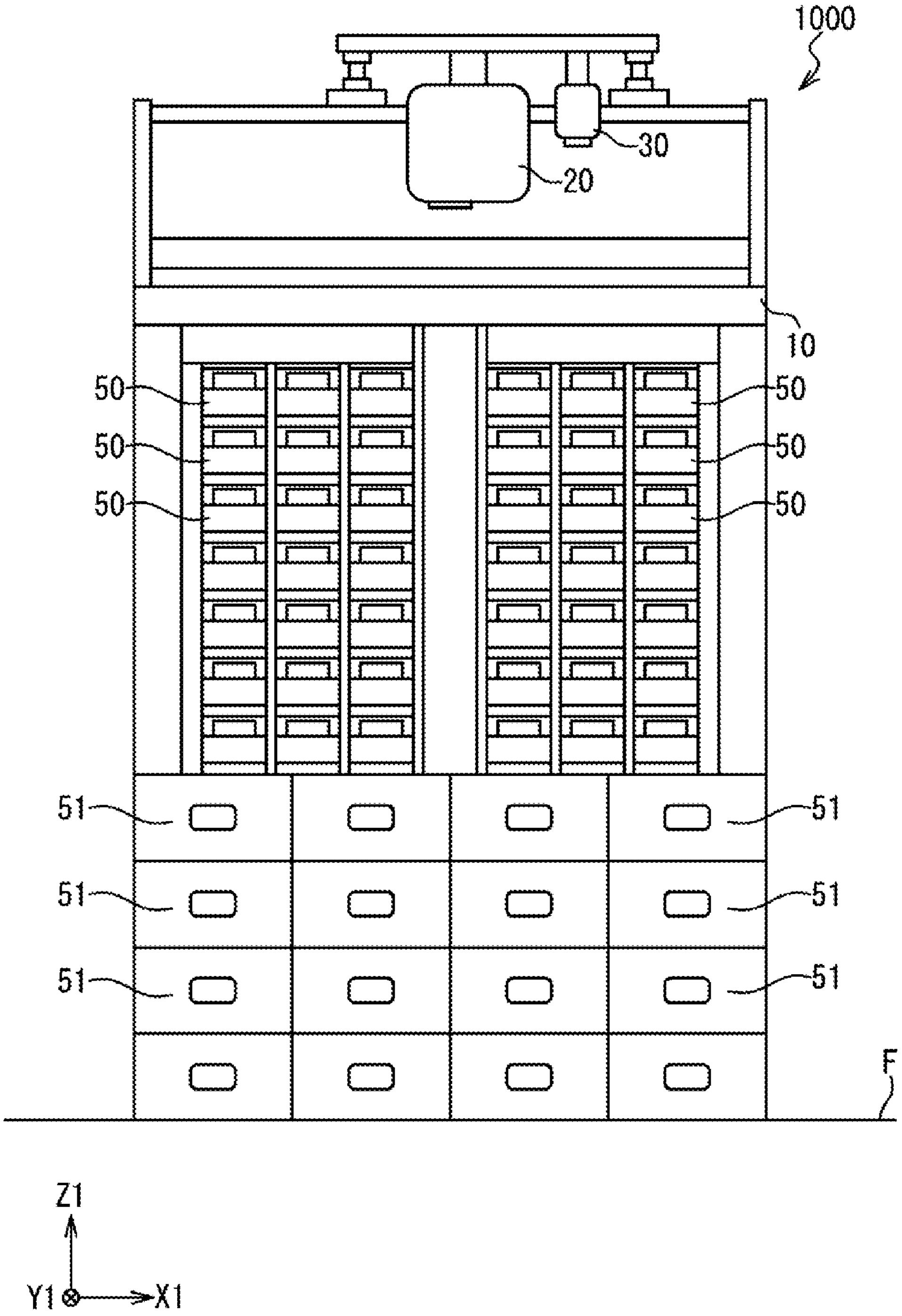
FIG. 8 is a front view of an operation assist apparatus according to an embodiment.

(Embodiment 2) The article shelf 10 may store the plurality of storage boxes 50 to be drawable in the direction −Y1 (forward direction), as shown in FIG. 8. In addition, the article shelf 10 may store a plurality of types of storage boxes 50 and 51 with different sizes, for example, relatively small storage boxes 50 and relatively large storage boxes 51. In this case, the operation assist apparatus 1000 is provided with the article shelf 10, the projector 20, the three-dimensional sensor 30, and the storage boxes 50 and 51.

The relatively small storage boxes 50 are configured to be stored in the direction +Z1 from the relatively large storage boxes 51, arranged side by side in a plane perpendicular to the direction Y1. For example, the storage boxes 50 are stored to be arranged side by side along the direction X1. In addition, the storage boxes 50 are stored to be arranged side by side along the direction Z1. The relatively large storage boxes 51 are configured to be stored between the relatively small storage boxes 50 and the floor F, arranged side by side in a plane perpendicular to the direction Y1. A lower part of the article shelf 10 that stores the storage boxes 51 protrudes in the direction −Y1 from a higher part that stores the storage boxes 50, as shown in FIG. 9.

Figure 9:
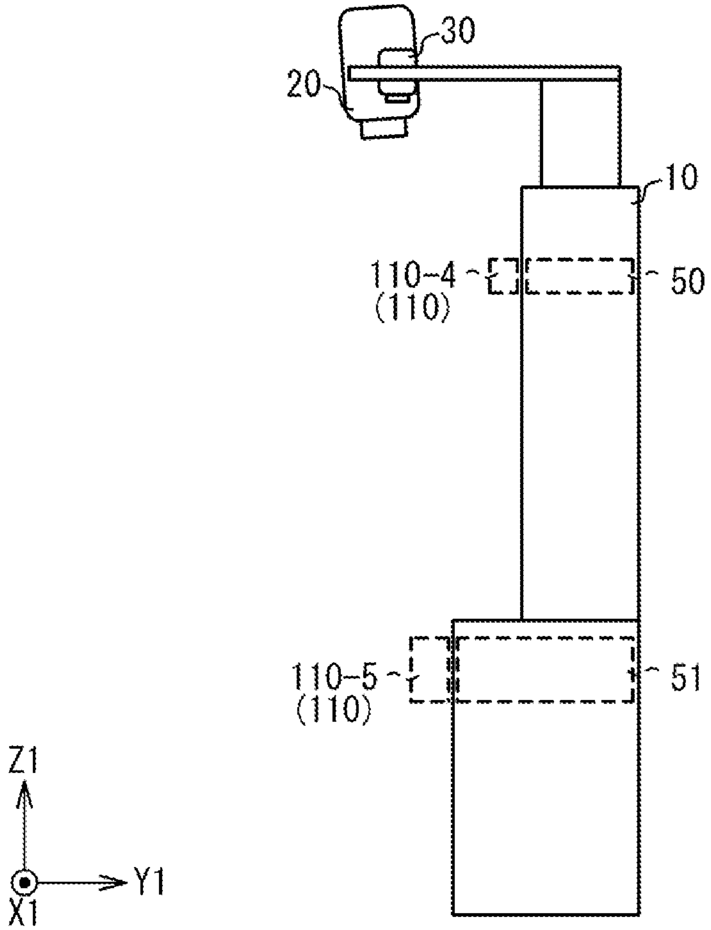
FIG. 9 is a side view of an operation assist apparatus according to an embodiment.

As shown in FIG. 8 and FIG. 9, the storage boxes 50 and 51 have rectangular shapes with opened top planes and are configured to store inside the plurality of articles 1 that the operator W takes out therefrom. The storage box 50 may be provided with a partition inside and store a plurality of types of articles 1 separately.

In addition, the storage boxes 50 and 51 are provided with grip parts on planes in the direction −Y1 (front planes). The grip parts are gripped and drawn by the operator W when drawing the storage boxes 50 and 51 from the article shelf 10.

The projector 20 is provided in the direction +Z1 (upward direction) from the article shelf 10 and is configured to project an image on a front plane of the article shelf 10. The projector 20 notifies an instruction for the operator W by projecting the image on a label of each storage box 50.

The three-dimensional sensor 30 is provided in the direction +Z1 (upward direction) from the article shelf 10 and detects the hand of the operator W when drawing the storage boxes 50. For example, as shown in FIG. 9, the three-dimensional sensor 30 detects an object 500, for example the hand of the operator W, that exists in fourth detection regions 110-4 that respectively correspond to the plurality of storage boxes 50. The fourth detection regions 110-4 are provided in the direction −Y1 from the storage boxes 50. In addition, the three-dimensional sensor 30 detects the object 500 that exists in fifth detection regions 110-5 that respectively correspond to the plurality of storage boxes 51. The fifth detection regions 110-5 are provided in the direction −Y1 from the storage boxes 51. For example, an object 500 in the fourth detection regions 110-4 and an object 500 in the fifth detection regions 110-5 that exist in the direction −Y1 from the fourth detection regions 110-4 are detected by a single three-dimensional sensor 30.

Shapes of the detection regions 110 may be determined in accordance with the direction in which the object 500 enters. For example, the detection regions 110 may be formed, in at least a part thereof, such that a cross-sectional area perpendicular to a direction in which the object 500 advances in the detection regions 110 monotonically decrease in the direction the object 500 advances. For example, a detection region 110 that corresponds to a storage box 51 that is relatively in the direction −Z1 (downward direction) may be formed such that a cross-sectional area of a plane perpendicular to the direction Z1 monotonically decreases in the direction −Z1. For example, a detection region 110 that corresponds to a storage box 51 may be formed so that a length thereof in the direction Y1 monotonically decreases in the direction −Z1. In addition, a detection region 110 that corresponds to a storage box 50 that is relatively in the direction +Z1 (upward direction) may be formed so that a cross-sectional area of a plane perpendicular to the direction Z1 monotonically decrease in the direction +Z1. For example, a detection region 110 that corresponds to a storage box 50 may be configured so that a length thereof in the direction Y1 monotonically decreases in the direction +Z1. Each detection region 110 may be formed in a shape different depending to a position thereof in the direction Z1.

Figure 10:
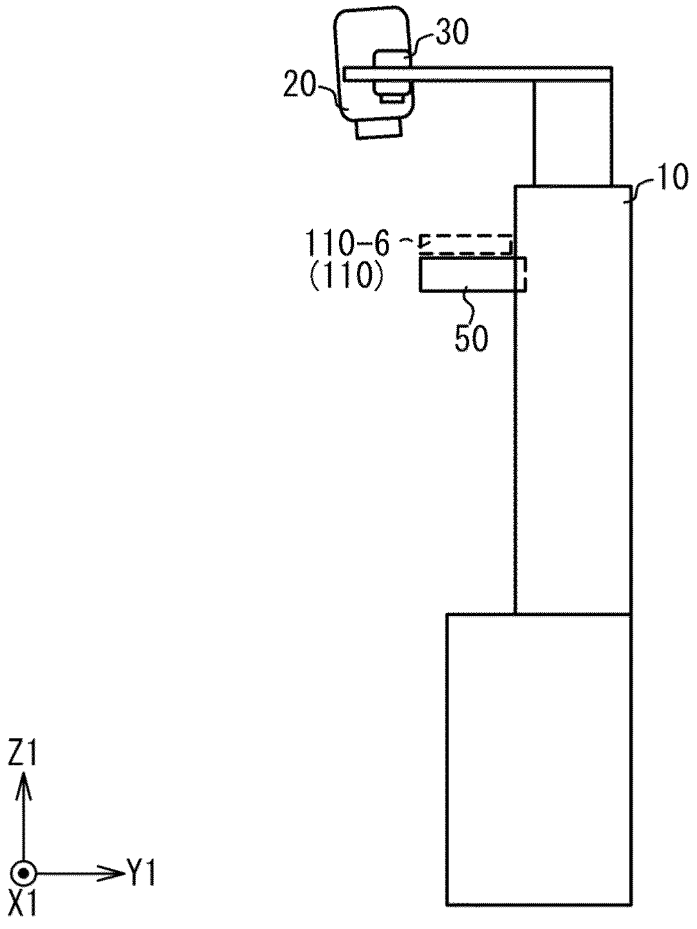
FIG. 10 is a diagram that shows a detection region when a storage box is drawn in an embodiment.

In addition, as shown in FIG. 10, when the storage box 50 is drawn, the three-dimensional sensor 30 sets the detection region 110 in a sixth detection region 110-6 that exists in the direction +Z1 from the storage box 50. The sixth detection region 110-6 may be divided, for example in accordance with the partition provided to the storage box 50. As a result, even if a plurality of articles 1 are separately stored in the storage box 50 by the partition, the three-dimensional sensor 30 can detect the article 1 that is taken out by the operator W. The shapes of the detection regions 110 that are set may be formed similarly to the detection regions 110 in the embodiment 1, for example the first detection region 110-1, the second detection region 110-2, and the third detection region 110-3 that are shown in FIG. 2.

The operation assist apparatus 1000 is provided with the control device 70 shown in FIG. 3, similarly to the embodiment 1. As the configuration of the control device 70 is similar to the embodiment 1, detailed description thereof will be omitted.

Figure 11A:
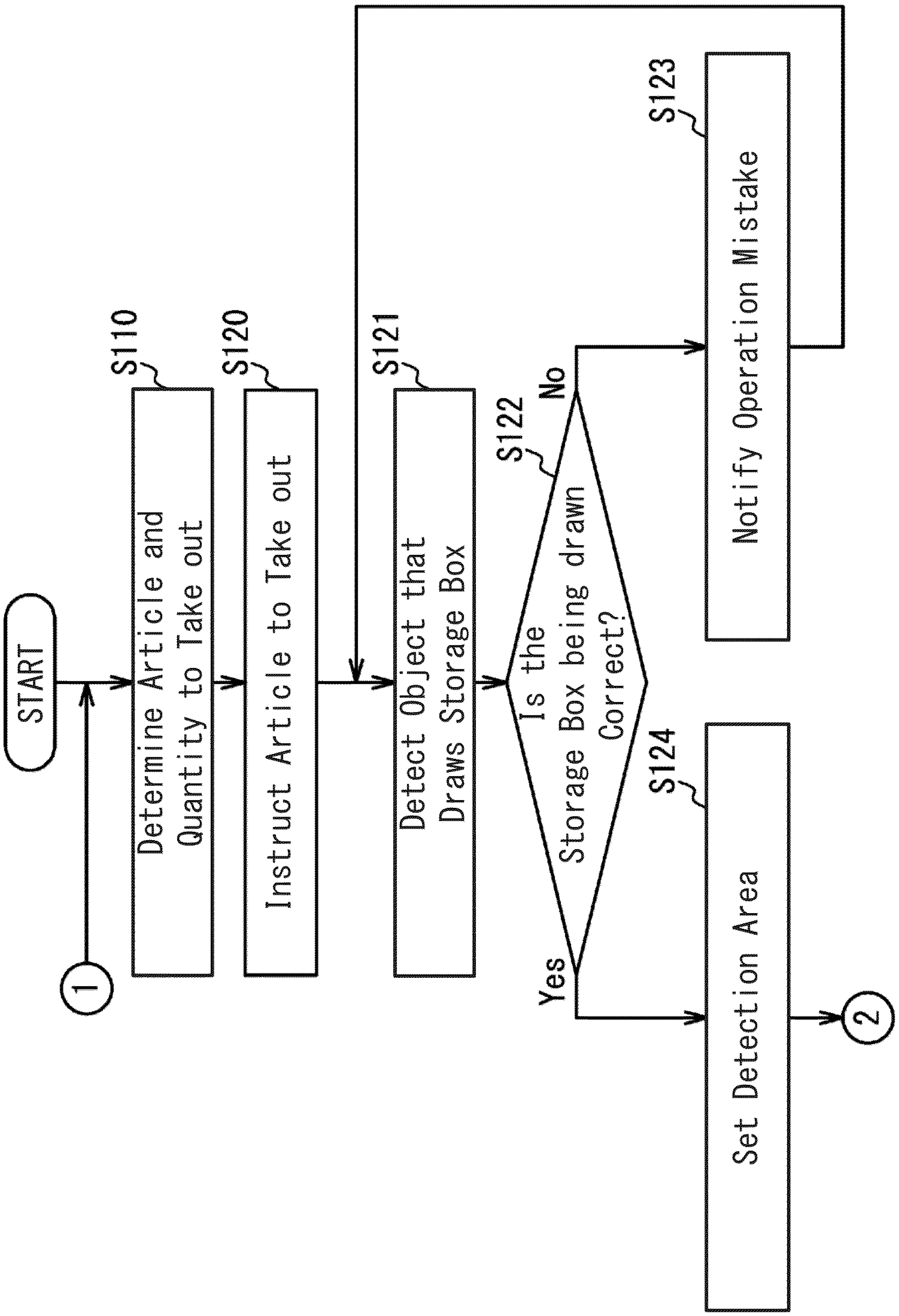
FIG. 11A is a flowchart that shows a process by an operation assist apparatus according to an embodiment.

(Operation of operation assist apparatus) When the operation assist apparatus 1000 is started, for example when the control terminal 200 and the management terminal 300 are started, a process for assisting a picking operation starts. When started, the processor 330 of the management terminal 300 executes the management program 350 to start the process shown in FIG. 11A and FIG. 11B. As the process of the step S110 and the process of the step S120 are similar to the embodiment 1, detailed description thereof will be omitted.

In the step S121, the processor 230 of the control terminal 200 detects the object 500, for example the hand of the operator W, that draws the storage boxes 50 and 51. For example, the processor 230 judges whether the object 500 exists in the detection regions 110, for example the fourth detection regions 110-4, the fifth detection regions 110-5 or the like. As the process of judging whether or not the object 500 exists in the detection regions 110 is similar to the embodiment 1, detailed description thereof will be omitted.

When judging that the object 500 exists in the detection regions 110, in the step S122, the processor 230 judges whether or not the storage box 50 or 51 that the detected object 500 draws is correct. For example, the processor 230 searches for the storage box 50 or 51 that corresponds to the detection region 110 where the object 500 exists. The processor 230 judges whether the article 1 represented by the instruction information obtained from the management terminal 300 is included in the articles 1 that are stored in the searched storage box 50 or 51. When the article 1 that the instruction information represents is not included in the searched storage box 50 or 51, the processor 230 executes the process of the step S123. When the article 1 that the instruction information represents is included in the searched storage box 50 or 51, the processor 230 executes the process of the step S124.

In the step S123, the processor 230 notifies the operator W of an operation mistake. As the process in which the processor 230 notifies the operation mistake is similar to the process of the step S160 shown in FIG. 4, detailed description thereof will be omitted. When the processor 230 does not detect the object 500 any more in the detection regions 110, the processor 230 executes the process of the step S121 and repeats the process.

When the storage box 50 or 51 that the object 500 draws is correct, in the step S124, the processor 230 sets a detection region 110 in the direction +Z1 from the drawn storage box 50 or 51. For example, as shown in FIG. 10, the processor 230 sets the detection region 110 in the direction +Z1 from the drawn storage box 50.

Figure 11B:
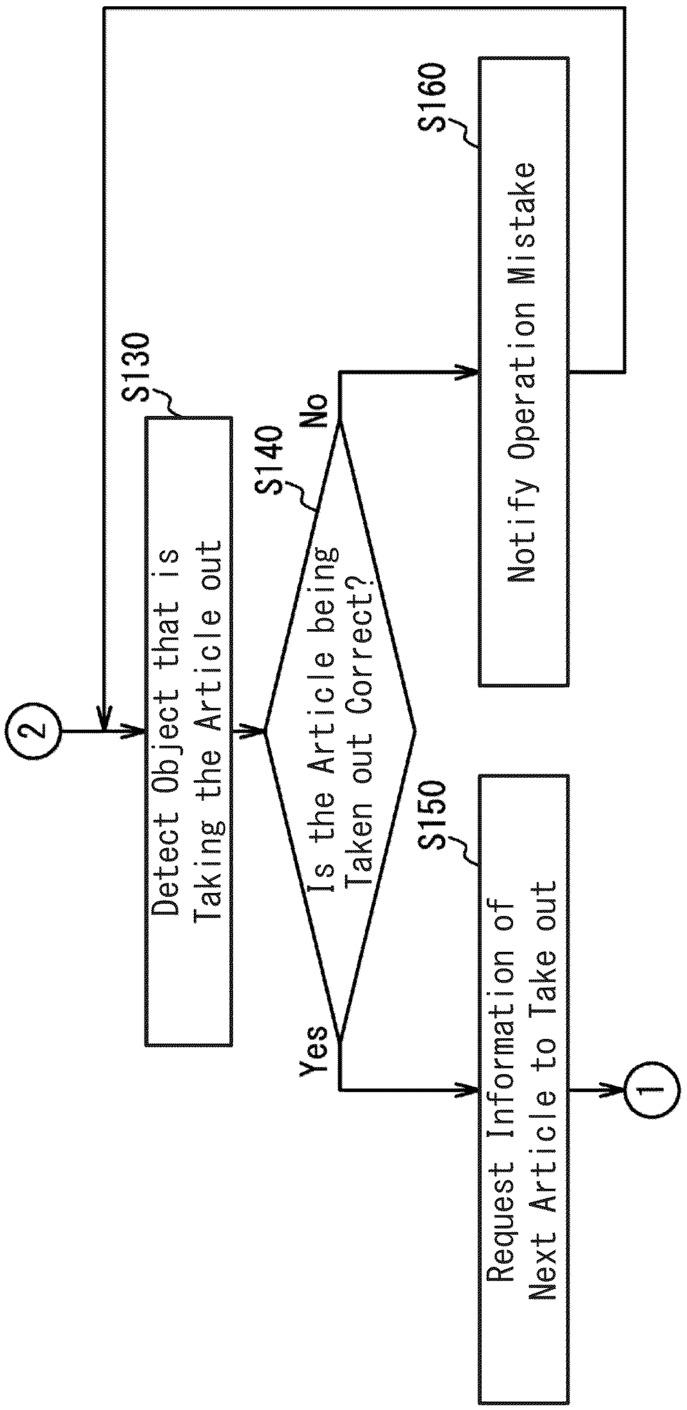
FIG. 11B is a flowchart that shows a process by an operation assist apparatus according to an embodiment.

In the step S130 shown in FIG. 11B, the processor 230 detects the object 500 that takes out the article 1 in the detection region 110 that is set, for example in the sixth detection region 110-6 shown in FIG. 10. For example, the processor 230 judges whether the object 500 exists in the detection region 110, for example the sixth detection region 110-6. As the process of judging whether or not the object 500 exists in the detection region 110 is similar to the embodiment 1, detailed description thereof will be omitted. When the sixth detection region 110-6 is divided in accordance with the partition provided to the storage box 50 or 51, the processor 230 judges in which one of divided detection regions into which the sixth detection region 110-6 is divided the object 500 exists.

When the object 500 exists in the sixth detection region 110-6, the processor 230 executes the process of the step S140. As the process of the step S140 is similar to the step S140 of the embodiment 1, detailed description thereof will be omitted. In addition, when the sixth detection region 110-6 is divided in accordance with the partition provided to the storage box 50 or 51, the processor 230 judges that the object 500 takes out the article 1 that corresponds to the divided detection region where the object 500 is detected.

As the process of the step S150 and the process of the step S160 are similar to the embodiment 1, detailed description thereof will be omitted.

As described above, the operation assist apparatus 1000 can detect the article 1 that the operator W takes out from the storage boxes 50 and 51 that are stored to be drawable in the direction −Y1. In addition, even if the storage boxes 50 and 51 are divided by the partitions and store different types of articles 1, the operation assist apparatus 1000 can detect the article 1 that the operator W takes out.

It should be noted that the detection regions 110, for example the fourth detection regions 110-4, the fifth detection regions 110-5, and the sixth detection regions 110-6, are set by use of the distance display image, similarly to the detection regions 110 in the embodiment 1.

(Variation examples) The process described above is an example, and the order and the process content of each step may be changed within a scope of not impeding the function thereof. In addition, the described configuration may be arbitrarily changed within a scope of not impeding the function thereof. For example, the screen 13 may be provided at an arbitrary position as long as the display region 100 thereof is configured to correspond to the storage box 50. For example, the screen 13 may be provided in upward direction from the storage box 50 and may be provided in front direction from the storage box 50.

The three-dimensional sensor 30 may be provided in an arbitrary position as long as the object 500 can be detected in the detection regions 110 that corresponds to the storage boxes 50. For example, the three-dimensional sensor 30 may be provided in the direction Y1 from the article shelf 10.

In addition, the detection region 110 may be formed in an arbitrary shape as long as the object 500 that takes out the article 1 from the storage box 50 can be detected. For example, all of the detection regions 110 can be formed in an identical shape.

The three-dimensional sensor 30 may further detect the operator W that takes out the article 1. For example, the three-dimensional sensor 30 detects a region where the operator W exists when taking out the article 1. The processor 230 of the control terminal 200 identifies the operator W based on information of the operator W that the three-dimensional sensor 30 detected. The processor 230 identifies the operator W that corresponds to the object 500 detected in the detection regions 110. As a result, even if a plurality of operators W take out the articles 1 stored in a same article shelf 10, the processor 230 can detect the article 1 that each operator W takes out.

The embodiments and the variation examples described above are merely examples, and the configurations described in each embodiment and variation example may be arbitrarily changed and/or arbitrarily combined within a scope of not impeding the function thereof. Furthermore, as long as a necessary function can be achieved, a part of the function described in the embodiments and the variation examples may be omitted.

For example, as shown in FIG. 8, when the article shelf 10 stores the storage boxes 50 drawable in the direction −Y1, the processor 230 of the control terminal 200 may judge that the article 1 stored in the storage box 50 is taken out as the storage box 50 is drawn. In this case, as shown in FIG. 9, when the object 500 is detected in a detection region 110 provided in a front direction from a storage boxes 50 or 51, the processor 230 judges that the article 1 stored in the storage boxes 50 or 51 is taken out.

The processor 230 of the control terminal 200 may execute all or a part of the processes of the processor 330 of the management terminal 300. In addition, processor 330 of the management terminal 300 may execute all or a part of the processes of the processor 230 of the control terminal 200. In addition, the control program 250 may include the management program 350.

In addition, although an example in which the operation assist apparatus 1000 notifies a mistake in an operation of the operator W taking out an article 1 from a storage box 50 has been described, the operation assist apparatus 1000 may notify a mistake in an operation of the operator W storing an article 1 into a storage box 50.

Figure 6A:
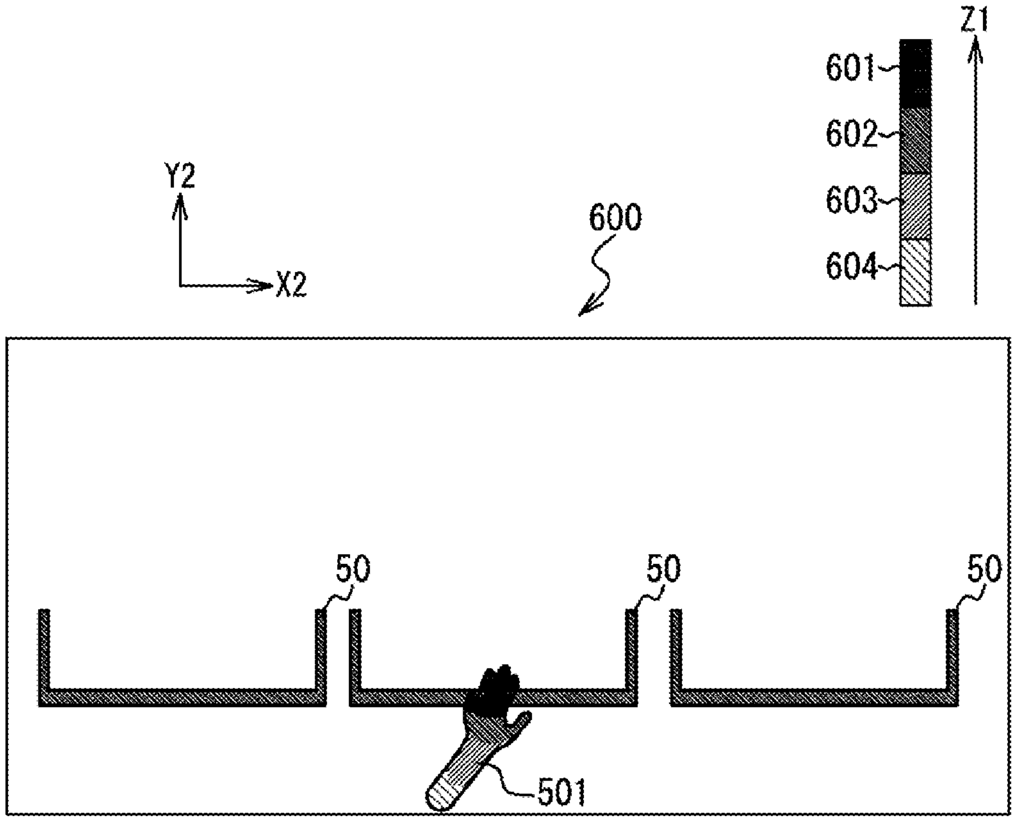
FIG. 6A shows a distance display image that is displayed when setting a detection region in an embodiment.
Figure 6B:
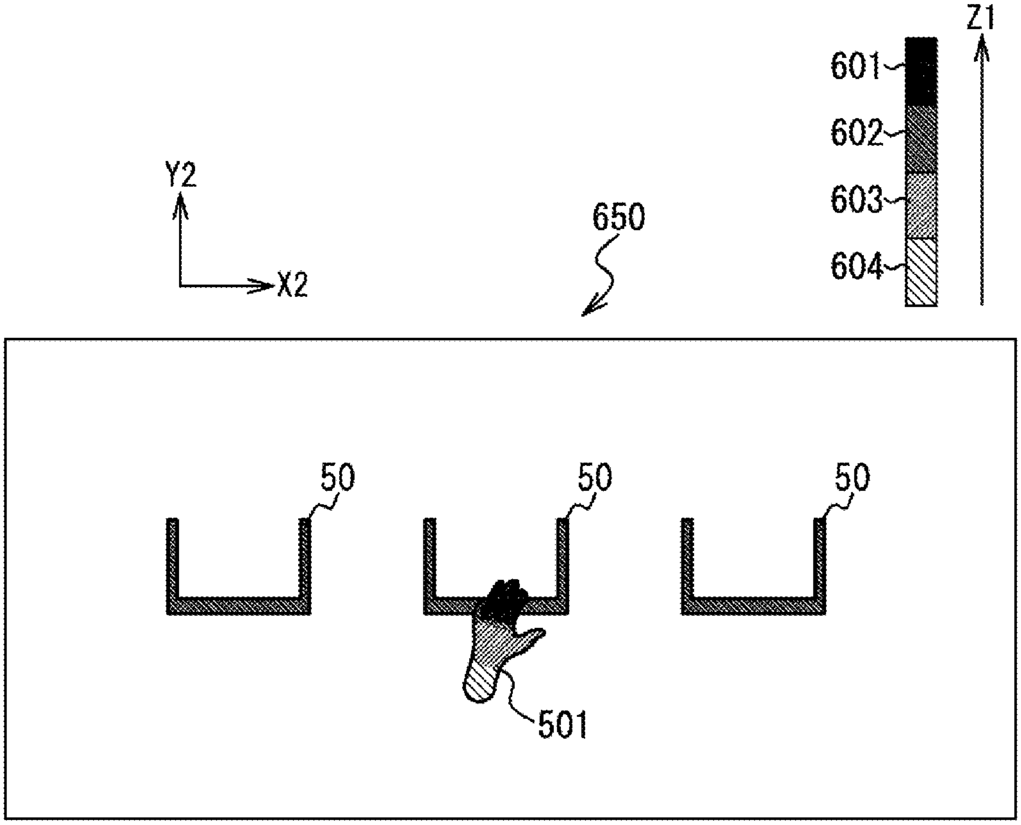
FIG. 6B shows a distance display image that is displayed when setting a detection region in an embodiment.
Figure 12:
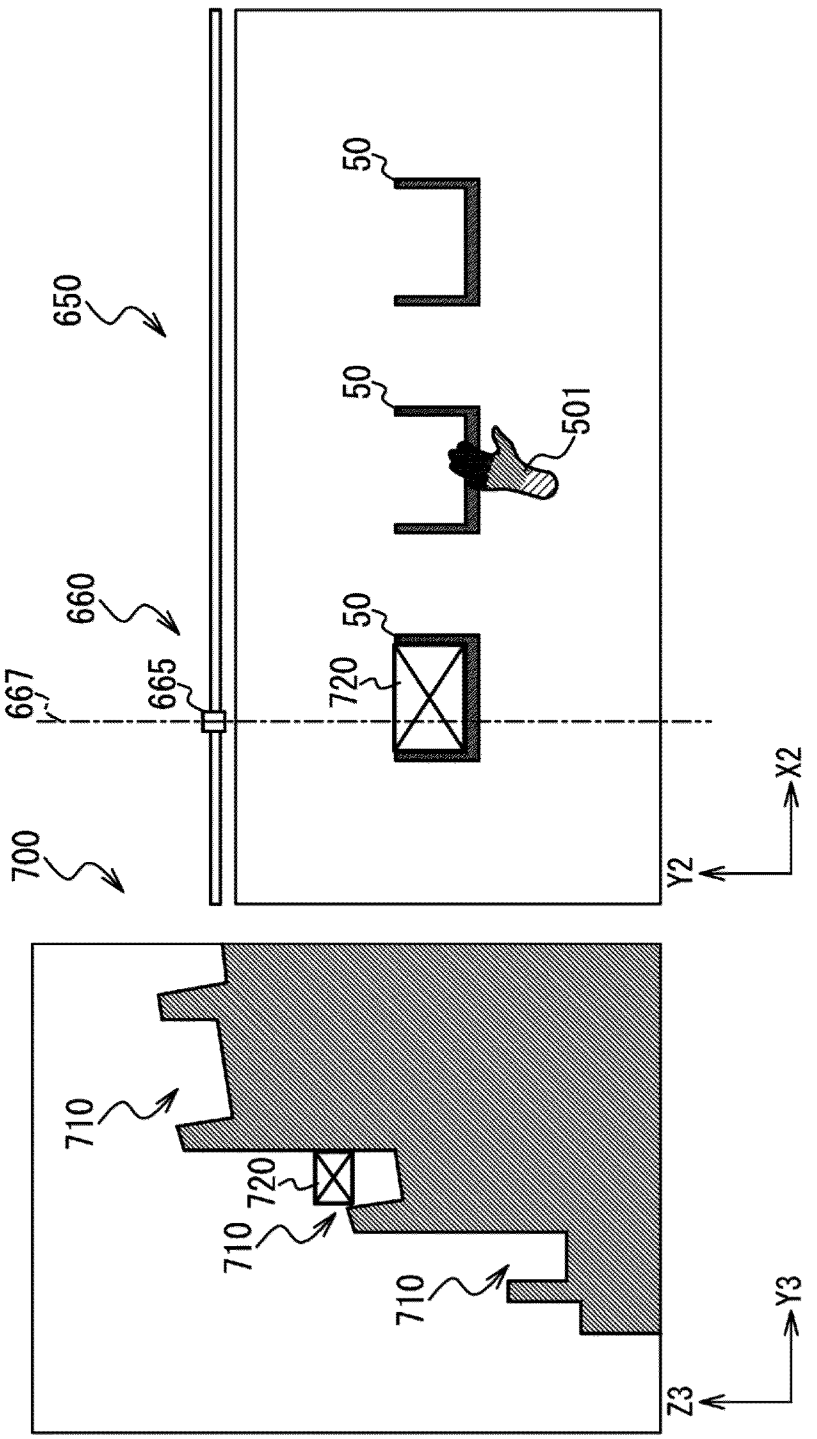
FIG. 12 is a diagram that shows a cross-sectional distance image that is displayed when setting a detection region in an embodiment.

The processor 330 of the management terminal 300 may display, together with the first distance display image 600 shown in FIG. 6A or the second distance display image 650 shown in FIG. 6B, a cross-sectional distance image 700 that represents a cross-section of the first distance display image 600 or the second distance display image 650 that are detected by the three-dimensional sensor 30. For example, the management terminal 300 displays, as shown in FIG. 12, the second distance display image 650 and the cross-sectional distance image 700 by arranging side by side. For example, the cross-sectional distance image 700 shows a position that the three-dimensional sensor 30 detected in a plane shown in the second distance display image 650, for example a cross-section perpendicular to the plane X1-Y1, such as a plane Y1-Z1 shown in FIG. 2. The position of the cross-section of the displayed cross-sectional distance image 700 is for example selected by a cross-section position selector 660. The cross-section position selector 660 is configured with a slider for example. By moving a knob 665 on the slider in the direction X2, the position of the cross-section shown in the cross-sectional distance image 700 is determined. For example, the cross-sectional distance image 700 shows a position that the three-dimensional sensor 30 detected in the cross-section 667 that corresponds to the position where the knob 665 is shown. Herein, the direction Y1 shown in FIG. 2 represents a direction Y3 in the cross-sectional distance image 700 shown in FIG. 12, and the direction Z1 shown in FIG. 2 represents a direction Z3 in the cross-sectional distance image 700 shown in FIG. 12.

In the cross-sectional distance image 700 shown in FIG. 12, an internal surface of the storage box 50 arranged furthest in the direction +Z1 in FIG. 2 represents a recess part 710 furthest in the direction +Z3. In FIG. 2, an internal surface of the storage box 50 arranged in second from the direction +Z1 represents the recess part 710 in the direction +Z3. In FIG. 2, an internal surface of the storage box 50 arranged furthest in the direction −Z1 represents the recess part 710 furthest in the direction −Z3.

A detection range 720 that represents a detection region 110 may be displayed in the second distance display image 650 and the cross-sectional distance image 700. The user verifies the detection region 110 based on the detection range 720 in the second distance display image 650 and the detection range 720 in the cross-sectional distance image 700. The detection region 110 may be changed by changing the detection range 720 displayed in the second distance display image 650 or the cross-sectional distance image 7M). For example, the user changes the detection region 110 by dragging a vertex of the detection range 720 shown in the second distance display image 650 or the cross-sectional distance image 700 and changing the detection range 720. As a result, the user can easily verify the detection region 110 and easily change the detection region 110.

The present application claims priority based on Japanese patent application No. 2021-171499 filed on Oct. 20, 2021 and herein incorporates the whole disclosure thereof.

What is claimed is:

1. An operation assist apparatus comprising:

a plurality of storage boxes configured to store an article;

a three-dimensional sensor configured to detect a position of at least a part of a first surface of a first object that exists in a plurality of first detection regions respectively provided to the plurality of storage boxes and generate a distance data that indicates a distance to the at least a part of the detected first surface; and a processor configured to judge, based on the position of the at least a part of the first surface, whether or not the first object takes out the article stored in the plurality of storage boxes, or whether or not the first object stores the article into the plurality of storage boxes, wherein the processor is further configured to judge, when a number of points that represent the at least a part of the first surface in the distance data is greater than a first threshold value, that the first object is picking the article or storing the article into the plurality of storage boxes, and wherein at least a part of a shape of one first detection region of the plurality of first detection regions is configured such that a first cross-sectional area of the one first detection region monotonically decreases in a first direction in which the first object advances when the first object takes out the article or when the first object stores the article, the first cross-sectional area being perpendicular to the first direction.

2. The operation assist apparatus according to claim 1, wherein the processor is further configured to output a distance display image, representing a part of the distance data, that represents an object included in an inputted range of distance, wherein the distance display image is viewed from the three-dimensional sensor.

3. The operation assist apparatus according to claim 1, wherein the processor is further configured to output the number of the points in real time.

4. The operation assist apparatus according to claim 1, wherein the processor is further configured to output a cross-sectional distance image that represents a position that the three-dimensional sensor has detected in a cross-section perpendicular to a surface represented by the distance display image.

5. The operation assist apparatus according to claim 4, wherein the processor is further configured to output an image that represents a cross-section position selector configured to set a position of the cross-section represented in the cross-sectional distance image.

6. The operation assist apparatus according to claim 1, wherein the longer the distance from the three-dimensional sensor to a corresponding first detection region of the plurality of first detection regions is, the smaller the first threshold value is.

7. The operation assist apparatus according to claim 1, wherein the processor is further configured to judge, when a number of points that represent the at least a part of the first surface is smaller than a second threshold value in the distance data, that the first object is picking the article or storing the article into the plurality of storage boxes.

8. The operation assist apparatus according to claim 1, wherein the three-dimensional sensor is further configured to detect an operator who picks the article or stores the article, and wherein the processor is further configured to:

distinguish the operator based on information of the detected operator; and identify the operator who corresponds to the first object detected in the plurality of first detection regions.

9. The operation assist apparatus according to claim 1, wherein the three-dimensional sensor is further configured to detect a position of at least a part of a first article surface of an article that exists in a fullness detection region provided to an opening of the plurality of storage boxes and generate the distance data that indicates a distance to the at least a part of the detected second article surface, and wherein the processor is further configured to judge, when a number of points that represent the at least a part of the first article surface in the distance data is greater than a fullness threshold value, that a storage box of the plurality of storage boxes that corresponds to the fullness detection region is full.

10. The operation assist apparatus according to claim 1, wherein the three-dimensional sensor is further configured to detect a position of at least a part of a second article surface of an article that exists in an emptiness detection region provided at a bottom of the plurality of storage boxes and generate the distance data that indicates a distance to the at least a part of the detected second article surface, and wherein the processor is further configured to judge, when a number of points that represent in the distance data the at least a part of the second article surface is smaller than an emptiness threshold value, that a storage box of the plurality of storage boxes that corresponds to the emptiness detection region is empty.

11. An operation assist apparatus comprising:

a plurality of storage boxes configured to store an article;

a three-dimensional sensor configured to detect a position of at least a part of a first surface of a first object that exists in a plurality of first detection regions respectively provided to the plurality of storage boxes and generate a distance data that indicates a distance to the at least a part of the detected first surface;

a processor configured to judge, based on the position of the at least a part of the first surface, whether or not the first object takes out the article stored in the plurality of storage boxes, or whether or not the first object stores the article into the plurality of storage boxes; and an article shelf configured to store the plurality of storage boxes to be drawable in forward, wherein the processor is further configured to judge, when a number of points that represent the at least a part of the first surface in the distance data is greater than a first threshold value, that the first object is picking the article or storing the article into the plurality of storage boxes, wherein the three-dimensional sensor is further configured to detect a position of at least a part of a second surface of a second object that exists in a plurality of second detection regions provided in forward of the plurality of storage boxes, and wherein the processor is further configured to set, when a first storage box of the plurality of storage boxes is drawn in forward, a detection region of the plurality of first detection regions above the first storage box.

12. A non-transitory tangible storage medium storing a control program that makes a processor execute:

calculating, in a distance data that indicates a distance from a three-dimensional sensor to at least a part of a first surface of a first object that exists in a plurality of first detection regions respectively provided to a plurality of storage boxes configured to store an article, a number of points that represent the at least a part of the first surface; and determining, when the calculated number of points is greater than a first threshold value, that the first object takes out the article or stores the article in the plurality of storage boxes, wherein at least a part of a shape of one first detection region of the plurality of first detection regions is configured such that a first cross-sectional area of the one first detection region monotonically decreases in a first direction in which the first object advances when the first object takes out the article or when the first object stores the article, the first cross-sectional area being perpendicular to the first direction.

* * * * *